(12) United States Patent
Bühring

(10) Patent No.: US 12,132,585 B2
(45) Date of Patent: Oct. 29, 2024

(54) COMMUNICATION INTERFACE

(71) Applicant: Volkswagen Aktiengesellschaft, Wolfsburg (DE)

(72) Inventor: Roy Bühring, Wittingen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 18/044,305

(22) PCT Filed: Aug. 27, 2021

(86) PCT No.: PCT/EP2021/073818
§ 371 (c)(1),
(2) Date: Mar. 7, 2023

(87) PCT Pub. No.: WO2022/053341
PCT Pub. Date: Mar. 17, 2022

(65) Prior Publication Data
US 2024/0031198 A1    Jan. 25, 2024

(30) Foreign Application Priority Data
Sep. 8, 2020    (DE) .................. 10 2020 211 233.9

(51) Int. Cl.
*H04L 12/40*    (2006.01)
*H04L 67/12*    (2022.01)

(52) U.S. Cl.
CPC .............. *H04L 12/40* (2013.01); *H04L 67/12* (2013.01); *H04L 2012/40273* (2013.01)

(58) Field of Classification Search
CPC ... H04L 67/12; H04L 12/40; H04L 12/40169; H04L 2012/40273; G06F 3/038; B60R 2300/00
See application file for complete search history.

(56) References Cited

U.S. PATENT DOCUMENTS

| | | | |
|---|---|---|---|
| 9,135,756 B2 * | 9/2015 | Doughty | H04B 7/155 |
| 10,848,600 B2 * | 11/2020 | Lake | H04L 69/08 |
| 2009/0054069 A1 | 2/2009 | Calnan, III et al. | 455/445 |
| 2012/0192119 A1 | 7/2012 | Zaliva | 715/863 |
| 2013/0222210 A1 | 8/2013 | Wang et al. | 345/2.3 |

(Continued)

FOREIGN PATENT DOCUMENTS

| | | | | |
|---|---|---|---|---|
| DE | 102011106358 A1 | 3/2012 | ............. | B60K 35/00 |
| DE | 102020211233 A1 | 3/2022 | ........... | B60R 16/023 |

(Continued)

OTHER PUBLICATIONS

German Office Action, Application No. 102020211233.9, 6 pages, Jul. 1, 2021.

(Continued)

*Primary Examiner* — Tonia L Dollinger
*Assistant Examiner* — Linh T. Nguyen
(74) *Attorney, Agent, or Firm* — Slayden Grubert Beard PLLC

(57) ABSTRACT

The disclosure relates to a communication interface in a vehicle between a head unit and human interface devices that is flexible, low latency, and comparatively lightweight. The communication interface is centrally defined so that it is valid for all communication paths.

20 Claims, 7 Drawing Sheets

(56) References Cited

U.S. PATENT DOCUMENTS

| | | | |
|---|---|---|---|
| 2014/0002399 A1 | 1/2014 | Kambhatla et al. | 345/173 |
| 2014/0019653 A1 | 1/2014 | Amchislavsky et al. | 710/106 |
| 2014/0120829 A1 | 5/2014 | Bhamidipati et al. | 455/3.06 |
| 2014/0222893 A1* | 8/2014 | Gangadharan | H04L 65/1069 709/203 |
| 2014/0340510 A1* | 11/2014 | Ihlenburg | G02B 3/14 348/118 |
| 2015/0051787 A1* | 2/2015 | Doughty | B60R 16/023 701/31.5 |
| 2015/0067819 A1* | 3/2015 | Shribman | H04L 63/0407 709/218 |
| 2016/0197782 A1* | 7/2016 | Hort | H04L 69/08 709/222 |
| 2016/0371957 A1* | 12/2016 | Ghaffari | G01M 5/00 |
| 2017/0004103 A1 | 1/2017 | Voto et al. | 710/313 |
| 2017/0372535 A1* | 12/2017 | Miller | G07C 5/0808 |
| 2018/0025507 A1* | 1/2018 | Hufnagel | G06T 7/74 382/291 |
| 2018/0129615 A1 | 5/2018 | Park et al. | |
| 2018/0184274 A1* | 6/2018 | Nakagawa | H04W 4/44 |
| 2018/0332524 A1* | 11/2018 | Rasanen | H04W 36/00835 |
| 2018/0339662 A1* | 11/2018 | Wincek | B60H 1/00878 |
| 2019/0007528 A1* | 1/2019 | Lake | H04L 69/18 |
| 2019/0179030 A1* | 6/2019 | Vasilyuk | G01C 21/1654 |
| 2019/0286607 A1* | 9/2019 | Troia | G06F 13/105 |
| 2020/0164747 A1* | 5/2020 | Oh | G06F 8/65 |
| 2021/0084122 A1* | 3/2021 | Lake | H04L 12/66 |
| 2022/0294607 A1* | 9/2022 | Zeh | H04L 9/0819 |
| 2022/0322871 A1* | 10/2022 | Simon | A47J 36/321 |

FOREIGN PATENT DOCUMENTS

| | | | | |
|---|---|---|---|---|
| WO | WO-2008043059 A1 * | 4/2008 | | B60R 11/02 |
| WO | 2017/193328 A1 | 11/2017 | | G06F 13/14 |
| WO | 2022/053341 A1 | 3/2022 | | H04L 12/40104 |

OTHER PUBLICATIONS

International Search Report and Written Opinion, Application No. PCT/EP2021/073818, 10 pages, Dec. 14, 2021.

* cited by examiner

COMMUNICATION INTERFACE

CROSS-REFERENCE TO RELATED APPLICATIONS

This application claims priority to German Patent Application No. DE 10 2020 211 233.9, filed on Sep. 8, 2020 with the German Patent and Trademark Office. The contents of the aforesaid Patent Application are incorporated herein for all purposes.

TECHNICAL FIELD

The invention relates to a communication interface in a vehicle between a head unit and at least one first human interface device (HID) and a second human interface device (HID), wherein a data exchange between the head unit and the first human interface device occurs via a first communication path, and wherein a data exchange between the head unit and the second human interface device occurs via a second communication path.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A large number of sensor apparatuses, control units and control computers are installed in modern motor vehicles. These elements are generally connected to each other by an onboard network that is frequently realized as a bus system. Data can be mutually exchanged via the bus system. External, higher-level systems can also be addressed via an interface. The control units, control computers and sensor devices—hereinafter collectively termed control units—are designed to perform various monitoring and control functions that arise in the motor vehicle. This includes, among other things, controlling and/or monitoring the engine and transmission controls, or antilock braking systems as well. To a certain extent, these systems must work in real time, or with minimal delay since important processes such, as for example, braking deceleration must be controlled.

Moreover, different functions must be settable by a user or a driver of the vehicle. These settings are enabled by input devices that need a communication interface in order, for example, to be able to communicate with a head unit.

The communication interfaces in motor vehicles known from the prior art have a disadvantage in that they are sometimes greatly latency-prone and/or require a comparatively elaborate stack.

SUMMARY

A need exists to present a communication interface in a vehicle that is flexible, low latency, and comparatively lightweight.

The need is addressed by the subject matter of the independent claims. Embodiments of the invention are described in the dependent claims, the following description, and the drawings.

DESCRIPTION

Figure 1:
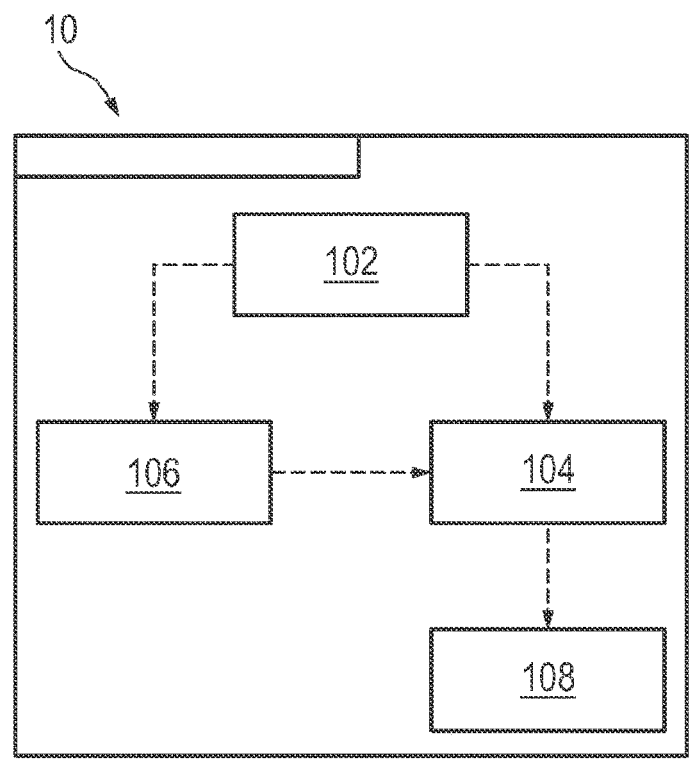
FIG. 1 shows a specification structure of an example embodiment of a communication interface.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A human interface device is a type of computer that interacts directly with humans, generally also receives input from humans, and sometimes also returns output to humans. The term HID is frequently used in conjunction with USB devices, and then in connection with USB HID. In the context of this application, keyboards, mice, joysticks, graphics tablets as well as in particular displays and tablet computers, for example, are understood as a human interface device. Buttons that are integrated in the vehicle are also understood as HIDs, such as on the steering wheel, as well as voice control and gesture control.

A head unit in the context of an infotainment system that, in a vehicle, unites the combination of the car radio, navigation system, hands-free apparatus, driver assistance system and other functions into a central control unit, is the main unit of the system. The main unit comprises one or more main boards that are equipped with processors and the like and form the heart of the infotainment system.

A centrally defined communication interface has the benefit of defined generic communication that can be used for a wide range of applications.

Other embodiments are apparent from the remaining features specified in the dependent claims.

In some embodiments of the communication interface, a transport layer is provided that allows a segmentation of data to be transmitted. The transport layer or a transmitting node of the transport layer can independently attempt to send a message. If the request cannot be successfully made after, for example, 1 second, a timeout signal is output. Depending on the application, it can be decided to send a message again. If for example, a "button press" is sent with a delay of 1 second, the delayed reaction of the system is not comprehensible to the user.

In some embodiments of the communication interface, an application layer is provided that allows a bidirectional exchange of data between the head unit and the first human interface device and/or the second human interface device. Since the human interface device is the data master, it necessarily has to contain values.

In some embodiments, it is provided that current statuses of the first human interface device and/or the second human interface device can be communicated and/or requested. All incorporated human interface devices must transmit their current status or send status messages. The status messages can also be requested by certain commands.

In some embodiments, it is provided that a change of the current status of the first human interface device and/or the second human interface device can be requested. In this case, it can be provided that each status change of an incorporated human interface device is transmitted by the human interface devices to the head unit. A status message is to be understood as a data operation message. This contains, among other things, an HID command.

In some embodiments, of the communication interface it is provided that an operation executed by the first human interface device and/or by the second human interface device can be assigned to a command that is defined in a command catalog. The commands and their data structure can be saved in application-dependent command catalogs. In this case, it is conceivable that all the commands supported for the particular human interface device can be requested by a command or a request.

The following commands are possible by way of example, but are not to be understood as an exclusive list:

A GET request triggers a demand for a supported command. By sending a FetchALL/Reset.GET request, the human interface device answers with all corresponding status messages in order to provide the current status of the HID without every feature having to be individually demanded.

A STATUS message generally indicates that a status of a human interface device has changed. The HID can indicate its start as a status message, for example when the HID was started later than a corresponding counterpart. This can also signal a resetting of the HID. Following a FetchAll/Reset-.STATUS message, the counterpart demands the current status for all commands since values in the cache may have become invalid.

A CommandSupport can instigate a dynamic communication of the commands defined within the command catalog and supported by the human interface device.

In some embodiments, it is provided that the centrally defined communication interface uses the ISO TP standard. To separate the exchange of different pieces of information, HID commands are used as the first parameter in the ISO TP data frame. The commands and their data structure are then correspondingly defined in application-dependent command catalogs. The first byte of an ISO TP data frame contains the HID command. Within a message, the big endian byte sequence is used to the extent that this has not been specified to the contrary by a command. This can for example be the case if all of the commands supported for the particular human interface device are requested by a command or a request. Only a multiple of bytes is permissible as the data type for a command. If a value does not precisely fit into one or more bytes, unused bits and bytes are filled with zeros.

At least one vehicle data bus, in particular a CAN bus, is provided for transmitting signals for comparatively simple communication in another embodiment of the communication interface. A vehicle data bus has the benefit that generally, several equal control units can be connected to each other. The CAN network works for example according to a line structure. Stub lines are permissible to a limited extent, as is a star-shaped bus. However, the disadvantage of the star-shaped bus is that it is usually controlled by a central computer since all of the information must pass through the central computer. Accordingly, if the central computer were to fail, the entire system would malfunction. Moreover, it is somewhat more involved to determine the line characteristic impedance of stub lines as well as the star-shaped architecture.

In some embodiments the communication interface, a video signal can be transmitted by the head unit to the first human interface device and/or the second human interface device. In this case, it can be provided that two displays need the communication interface as the human interface device, for example to turn the display lighting on/off. Both displays implement a common command catalog with an individual communication path. An implementation can be accessed in the head unit. One of the two displays requires an interface for touch entries that are not supported by the other display. The touch display can implement another command catalog without side effects on the first display. Other touch devices could then also access the already implemented command catalog.

Correspondingly, at least one third human interface device is provided in example embodiments, wherein the first human interface device is connected by a first vehicle data bus to the head unit, and wherein the second human interface device and the third human interface device are connected by a second vehicle data bus to the head unit. By means of a data bus structure and a generic communication interface, it is readily feasible for different devices to at least partially share the same communication path.

The various embodiments mentioned in this disclosure can be combined with one another, unless designed otherwise in individual cases.

The invention will be explained in further example embodiments in the following based on the associated drawings. Specific references to components, process steps, and other elements are not intended to be limiting. Further, it is understood that like parts bear the same or similar reference numerals when referring to alternate FIGS.

FIG. 1 shows that a data definition 104 exists for specific functions 102 of a communication interface 10 that is identified in FIG. 1 by 106 as HID commands which describe a specific implementation. The generally valid communication interface 10 uses the ISO TP standard 108.

Figure 2:
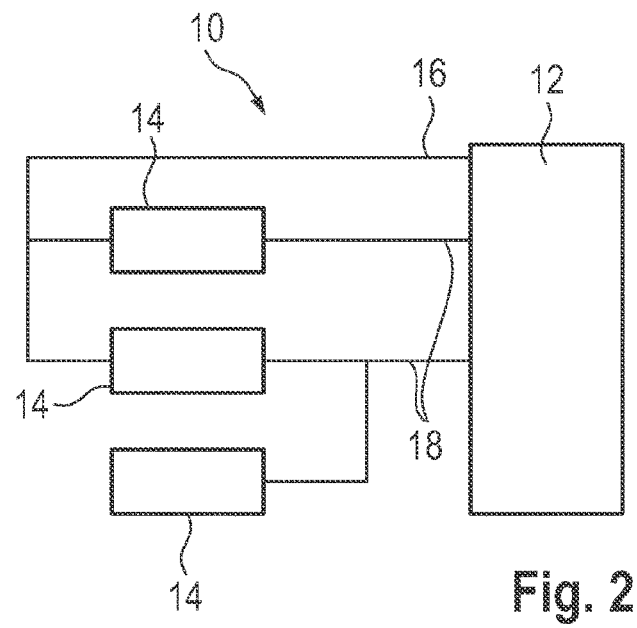
FIG. 2 shows a schematic representation of a system configuration for input and output devices of an example embodiment of a communication interface.

FIG. 2 shows a communication interface 10 in a vehicle between a head unit 12 and several human interface devices 14. For the connection, a generic approach is used in which the communication interface 10 is defined centrally and is valid for all communication paths that use this communication interface 10. Video signals 16 are independently transmitted by the head unit 12 to several human interface devices 14. A communication path is realized by separate CAN bus 20 connections. In this exemplary embodiment, the communication interface 10 uses a wakeable 2 Mbit/sec high-speed CAN connection.

Figure 3:
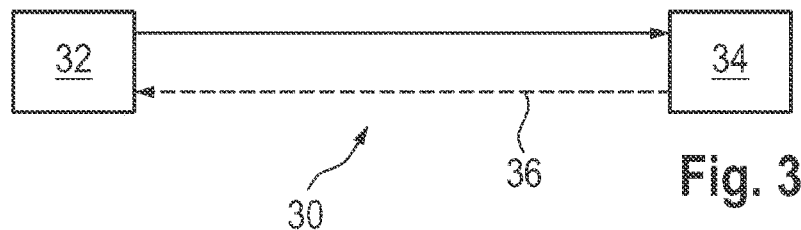
FIG. 3 shows a communication channel of the communication interface.

FIG. 3 shows that a bidirectional communication channel 30 is established for each connection on the application level. For a direction, separate CAN IDs are used for data transmission and for ISO TP segmentation control.

A demand message transmits data from LCU A 32 to LCU B 34. The response message 36 is only used for the ISO TP flow control frames. This is done to prevent collisions when two devices want to simultaneously send segmented TP messages. In order to transmit data from LCU B 32 to LCU A 34, a secondary communication channel with the request and response message must be used. A separate communication channel is used for each command catalog.

Figure 4:
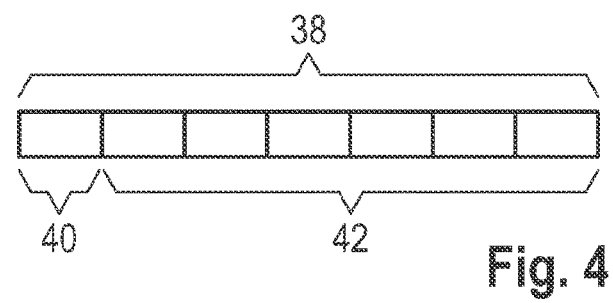
FIG. 4 shows an example embodiment of a data frame for a communication interface.

FIG. 4 shows a data frame 38 according to the ISO TP standard. To separate the exchange of different pieces of information, HID commands 40 are used as the first parameter in the ISO TP data frame. The commands and their data structure are defined in application-dependent command catalogs. The first byte of an ISO TP data frame contains the HID command. Within a message, the big endian byte sequence is to be used unless specified otherwise for a specific command due to application benefits. This is the case if all of the commands supported for the particular human interface device are requested by a command or a request.

Figure 5:
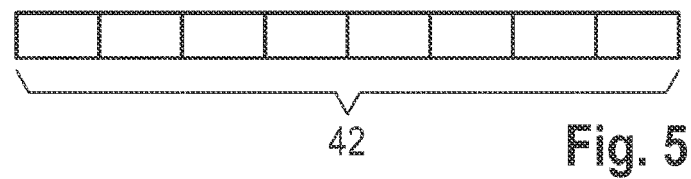
FIG. 5 shows the significance of a bit within a byte of the communication interface.

FIG. 5 shows the distribution of the significance of the bits in a byte 42 to be used in the exemplary embodiment.

Figure 6:
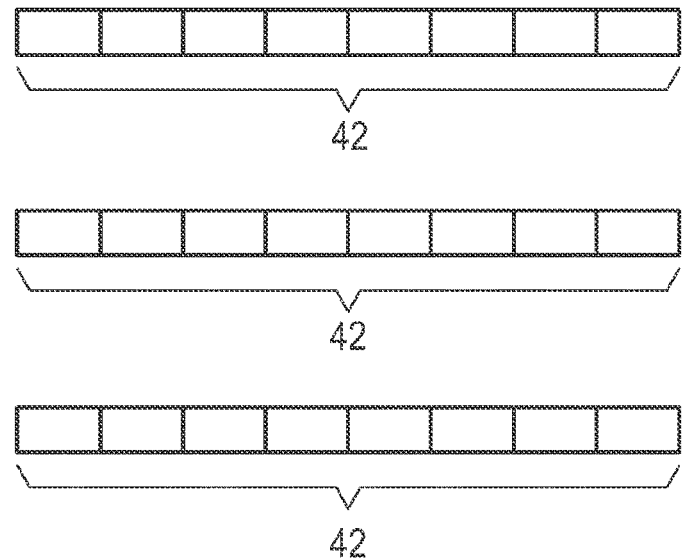
FIG. 6 shows irrelevant bits of the communication interface being filled with zeros.

FIG. 6 shows that only a multiple of bytes 42 is permissible as a datatype for a command whose relevance decreases from top to bottom in the illustration in FIG. 6. If a value does not precisely fit into one or more bytes, unused bits and bytes are filled with zeros. FIG. 6 shows an example of a 10 bit value within a three byte long message.

Figure 7:
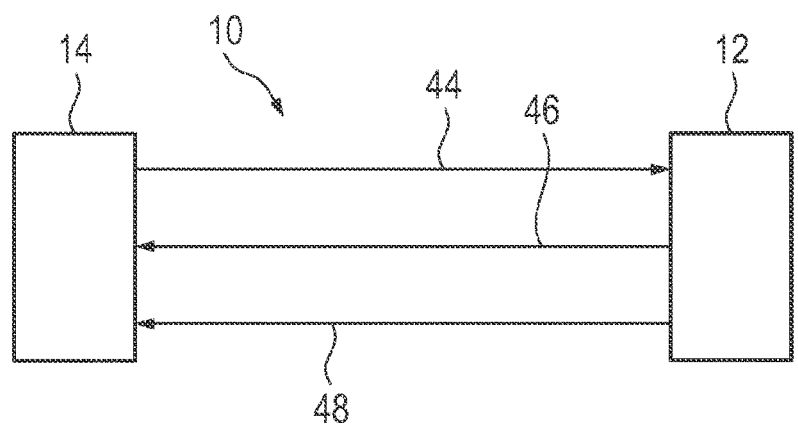
FIG. 7 shows possible directions of communication of the communication interface.

FIG. 7 shows that it is possible to send data as a consequence of a change in status, to request the current status, or to demand a status update. The human interface device 14 is the data master and transmits changes and actions as a STATUS message 44 to the head unit 12. The head unit 12 can demand data by sending a GET message 46 and can demand a data change by sending a SETGET message 48.

Figure 8:
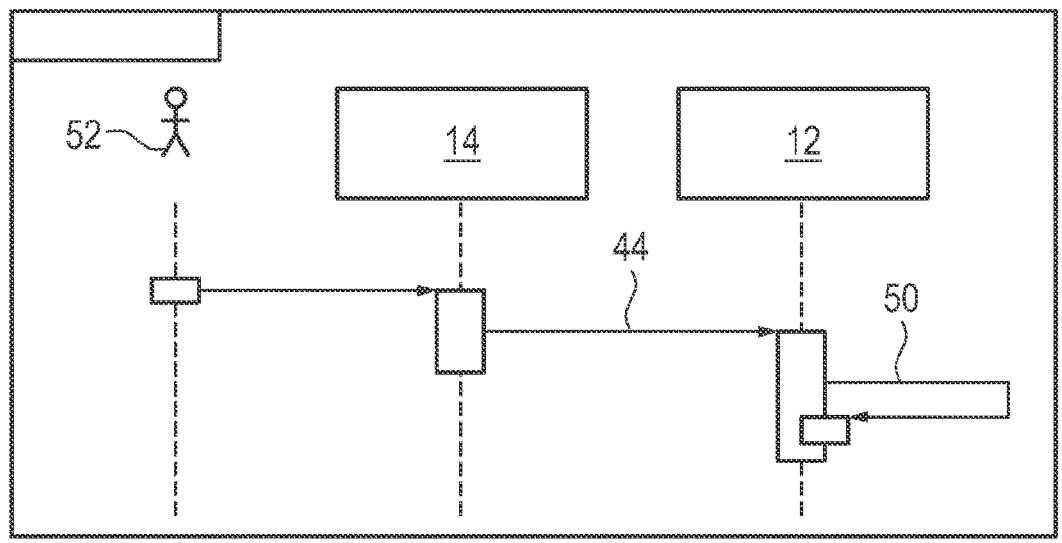
FIG. 8 shows the schematic process of sending new data via the communication interface.

FIG. 8 shows that all human interface devices 14 supply their current status by sending STATUS messages 44. Each internal status change of a human interface device 14 is to be reported to the head unit 12 by sending a STATUS message 44 with the new valid information that is registered by a TakeOverValue 50. A STATUS message 44 is a data operation message and contains an HID command as the first parameter. The following bytes contain the data as they are defined in the command catalog.

Figure 9:
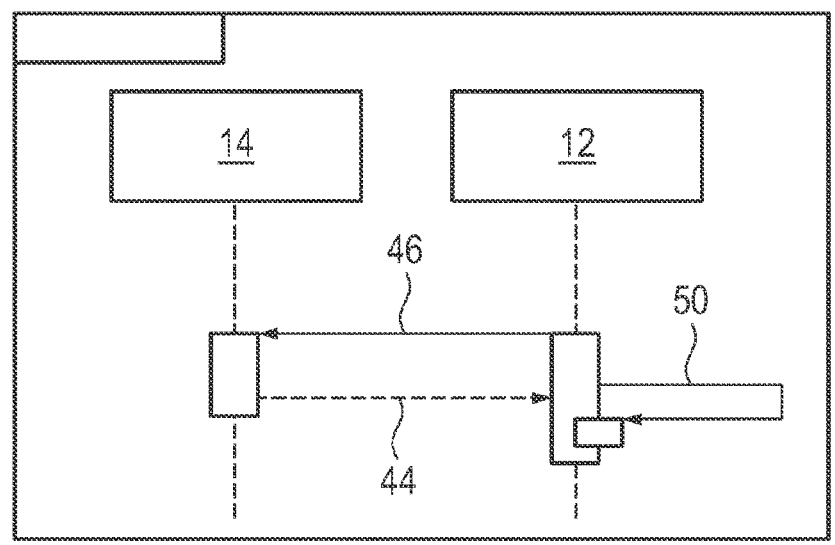
FIG. 9 shows the schematic process of requesting current data via the communication interface.

FIG. 9 shows that by sending a GET message 46 from the head unit 12, a STATUS message 44 can be demanded. A GET message 46 contains the HID command as the first parameter.

Figure 10:
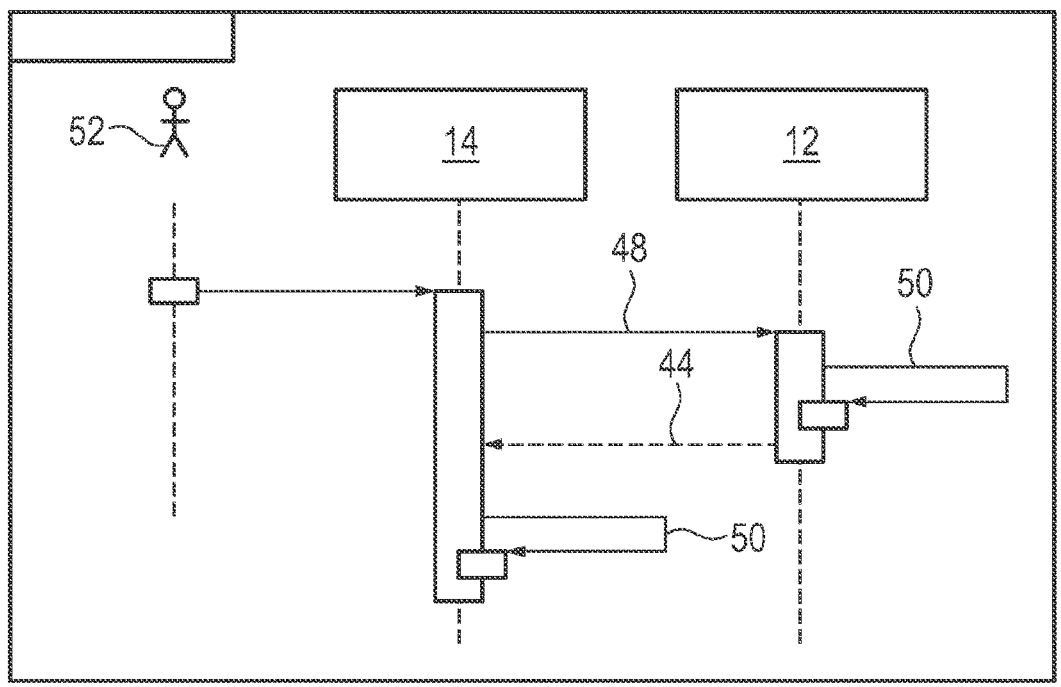
FIG. 10 shows the schematic process of changing data via the communication interface.

FIG. 10 shows that it is possible to change various data in the human interface device 14. For example, a system actuator 52 can change a property with the assistance of the head unit 14. The head unit 14 is able to send SETGET messages 48 for the indicated commands in order to demand a property change. A SETGET message 48 is a data operation message and contains the HID command as the first parameter. The following bytes contain the data as they are defined in the HID command catalog. SETGET messages 48 must be answered by sending a STATUS message 44 with the new set value. If a SETGET message 48 cannot be handled by the human interface device 14 because, for example, the demanded change exceeded the value range for this command, the STATUS message 44 can contain the last valid value.

Figure 11:
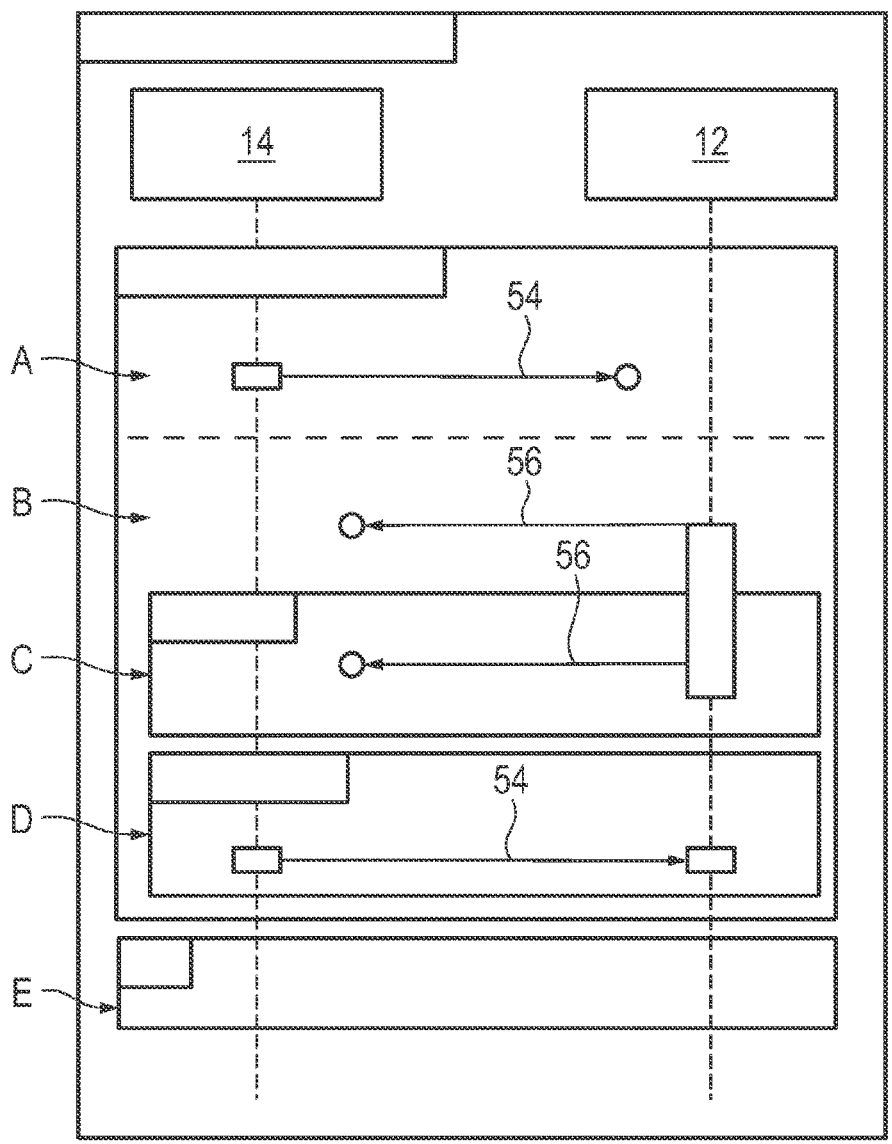
FIG. 11 shows a schematic representation of starting or resetting of the human interface device.

FIG. 11 shows that during the startup process, either the human interface device 14 or the counterpart can start faster. Each LCU must be able to establish communication within 600 ms. If the human interface device 14 is faster—indicated in FIG. 11 by A—the message FetchAll/Reset.STATUS 54 is irrelevant. The counterpart must demand all the properties once it is ready. If the human interface device 14 starts later—indicated in FIG. 11 by B—it must indicate its start in order to signal the availability of new data since FetchAll/Reset.GET messages 56 will not be answered. For this purpose, the human interface device 14 must send a FetchAll/Reset.STATUS message 54.

After a FetchAll/Reset.STATUS message 54, the counterpart must request the current status for all commands—indicated by D—as this would also be executed in a regular start since values in the cache might have become invalid. The head unit 12 may retry the FetchAll/Reset.GET message 56—indicated with C—in order to monitor the start of the human interface device 14. If no definitions have been made in the function-specific command catalog, the head unit 12 performs a retry following 1 s (after the reported default timeout). The transmission of all the data is illustrated in FIG. 11 by E.

Figure 12:
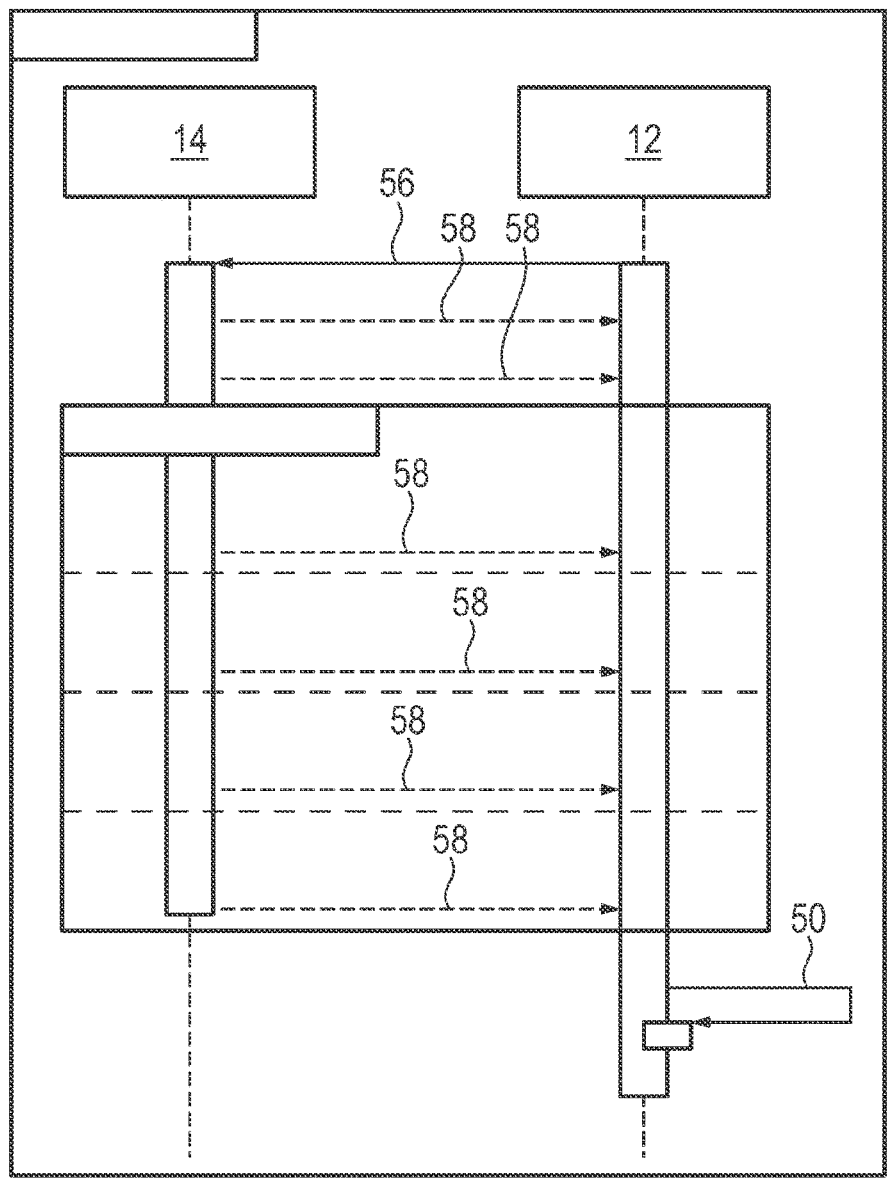
FIG. 12 shows a schematic representation of requesting all data via the communication interface.

FIG. 12 shows that it is possible to obtain a STATUS message 44 for all supported commands 58 at once to avoid requesting the current status individually for each command. Sending a FetchAll/Reset.GET message 58 to the human interface device 14 must be answered by the device with all of the supported STATUS messages 44. A FetchAll.GET message, like every GET message 44, contains the HID command as the first parameter. The following bytes are not used.

LIST OF REFERENCE NUMERALS

10 Communication interface
12 Head unit
14 Human interface device
16 Video signals
28 CAN bus
30 Bidirectional communication channel
32 LCU A
34 LCU B
36 Response message
38 Data frame
40 HID command
42 Byte
44 STATUS message
46 GET message
48 SETGET message
50 TakeOverValue
52 System actuator
54 FetchAll/Reset.STATUS message
56 FetchAll/Reset.GET message
58 Supported commands
102 Specific function
104 Data definition
106 HID command
108 ISO TP standard The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification"

and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A non-transitory storage medium comprising instructions, that when executed cause a processor to provide a communication interface in a vehicle between an infotainment system head unit of a vehicle infotainment system and at least one first human interface device (HID) and a second human interface device (HID); wherein
   a data exchange between the infotainment system head unit and the first human interface device occurs via a first communication path;
   a data exchange between the infotainment system head unit and the second human interface device occurs via a second communication path;
   the communication interface is defined centrally so that it is valid for communication paths including the first and second communication paths;
   at least one third human interface device is provided;
   the first human interface device is connected by a first vehicle data bus to the infotainment system head unit;
   the second human interface device and the third human interface device are connected by a second vehicle data bus to the infotainment system head unit; and
   each of the first human interface device, second human interface device, and third human interface device comprises a respective device that interacts directly with humans to receive input from humans and/or output information to humans.

2. The non-transitory storage medium comprising instructions, that when executed cause a processor to provide a communication interface of claim 1, wherein a transport layer is provided that allows a segmentation of data to be transmitted.

3. The non-transitory storage medium comprising instructions, that when executed cause a processor to provide a communication interface of claim 2, wherein an application layer is provided that allows a bidirectional exchange of data between the infotainment system head unit and the first human interface device and/or the second human interface device.

4. The non-transitory storage medium comprising instructions, that when executed cause a processor to provide a communication interface of claim 2, wherein current statuses of the first human interface device and/or the second human interface device can be communicated and/or requested.

5. The non-transitory storage medium comprising instructions, that when executed cause a processor to provide a communication interface of claim 2, wherein a change of the current status of the first human interface device and/or the second human interface device can be requested.

6. The non-transitory storage medium comprising instructions, that when executed cause a processor to provide a communication interface of claim 2, wherein an operation executed by the first human interface device and/or by the second human interface device is assigned to a command that is defined in a command catalog.

7. The non-transitory storage medium comprising instructions, that when executed cause a processor to provide a communication interface of claim 1, wherein an application layer is provided that allows a bidirectional exchange of data between the infotainment system head unit and the first human interface device and/or the second human interface device.

8. The non-transitory storage medium comprising instructions, that when executed cause a processor to provide a communication interface of claim 7, wherein current statuses of the first human interface device and/or the second human interface device can be communicated and/or requested.

9. The non-transitory storage medium comprising instructions, that when executed cause a processor to provide a communication interface of claim 7, wherein a change of the current status of the first human interface device and/or the second human interface device can be requested.

10. The non-transitory storage medium comprising instructions, that when executed cause a processor to provide a communication interface of claim 7, wherein an operation executed by the first human interface device and/or by the second human interface device is assigned to a command that is defined in a command catalog.

11. The non-transitory storage medium comprising instructions, that when executed cause a processor to provide a communication interface of claim 1, wherein current statuses of the first human interface device and/or the second human interface device can be communicated and/or requested.

12. The non-transitory storage medium comprising instructions, that when executed cause a processor to provide a communication interface of claim 11, wherein a change of the current status of the first human interface device and/or the second human interface device can be requested.

13. The non-transitory storage medium comprising instructions, that when executed cause a processor to provide a communication interface of claim 11, wherein an operation executed by the first human interface device and/or by the second human interface device is assigned to a command that is defined in a command catalog.

14. The non-transitory storage medium comprising instructions, that when executed cause a processor to provide a communication interface of claim 1, wherein a change of the current status of the first human interface device and/or the second human interface device can be requested.

15. The non-transitory storage medium comprising instructions, that when executed cause a processor to provide a communication interface of claim 14, wherein an operation executed by the first human interface device and/or by the second human interface device is assigned to a command that is defined in a command catalog.

16. The non-transitory storage medium comprising instructions, that when executed cause a processor to provide a communication interface of claim 1, wherein an operation executed by the first human interface device and/or by the second human interface device is assigned to a command that is defined in a command catalog.

17. The non-transitory storage medium comprising instructions, that when executed cause a processor to provide a communication interface of claim 1, wherein the centrally defined communication interface uses the ISO 15765-2 standard.

18. The non-transitory storage medium comprising instructions, that when executed cause a processor to provide a communication interface of claim 1, wherein at least one vehicle data bus is provided for signal transmission.

19. The non-transitory storage medium comprising instructions, that when executed cause a processor to provide a communication interface of claim 1, wherein a video signal can be transmitted by the infotainment system head unit to the first human interface device and/or the second human interface device.

20. The non-transitory storage medium comprising instructions, that when executed cause a processor to provide a communication interface of claim 1, wherein at least one CAN bus is provided for signal transmission.

* * * * *